United States Patent [19]

Hasegawa et al.

[11] Patent Number: 6,089,594
[45] Date of Patent: *Jul. 18, 2000

[54] SEAT STRUCTURE HAVING A SIDE IMPACT AIR BAG APPARATUS

[75] Inventors: Yasunori Hasegawa, Kasugai; Hisaaki Kato, Anjyo; Mitsuyoshi Ohno, Toyota; Makoto Sekizuka, Toyota; Toshihiko Kajiyama, Toyota, all of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/710,417

[22] Filed: Sep. 17, 1996

[30] Foreign Application Priority Data

Sep. 18, 1995 [JP] Japan .................................. 7-238489

[51] Int. Cl.⁷ .................................................. B60R 21/22
[52] U.S. Cl. .................................... 280/730.2; 280/730.1; 280/728.2
[58] Field of Search ............................. 280/730.2, 730.1, 280/728.2, 728.1; 297/216.13

[56] References Cited

U.S. PATENT DOCUMENTS

| | | |
|---|---|---|
| 5,112,079 | 5/1992 | Haland et al. . |
| 5,222,761 | 6/1993 | Kaji et al. . |
| 5,238,342 | 8/1993 | Haland et al. . |
| 5,251,931 | 10/1993 | Semchena et al. . |
| 5,498,030 | 3/1996 | Hill et al. . |
| 5,503,428 | 4/1996 | Awotwi et al. ...................... 280/730.2 |
| 5,556,127 | 9/1996 | Hurford et al. ...................... 280/730.2 |
| 5,588,671 | 12/1996 | Boumarafi et al. .................. 280/730.2 |
| 5,601,332 | 2/1997 | Schultz et al. ...................... 297/216.13 |
| 5,651,582 | 7/1997 | Nakano .............................. 297/216.13 |
| 5,667,243 | 9/1997 | Fisher et al. ......................... 280/730.2 |
| 5,735,572 | 4/1998 | Clark et al. ...................... 280/730.2 X |
| 5,816,610 | 10/1998 | Higashiwa et al. .................. 282/728.3 |
| 5,826,938 | 10/1998 | Yanase et al. ....................... 297/216.3 |

FOREIGN PATENT DOCUMENTS

| | | |
|---|---|---|
| 46-34024 | 4/1973 | Japan . |
| 4-050052 | 2/1992 | Japan . |
| 4-348712 | 12/1992 | Japan . |
| 7-215159 | 8/1995 | Japan . |

Primary Examiner—Christopher P. Ellis
Attorney, Agent, or Firm—Pillsbury Madison & Sutro LLP

[57] ABSTRACT

In a seat structure having a side impact air bag apparatus, a seat back frame has side frames each provided at a corresponding widthwise direction side of a seat. An air bag accommodating concave portion is formed in one of the side frames which opposes a vehicle door such that the concave portion extends inward from an end portion of the seat back frame in the widthwise direction of the seat. The air bag accommodating concave portion accommodates an inflator and a folded air bag. A seat pad is provided for covering the seat back frame, and a seat surface layer is provided for covering the seat pad. The seat surface layer covers the air bag accommodating concave portion and the seat pad.

22 Claims, 9 Drawing Sheets

SEAT STRUCTURE HAVING A SIDE IMPACT AIR BAG APPARATUS

BACKGROUND OF THE INVENTION

1. Field of the Invention

The present invention relates to a seat structure having an air bag apparatus for a side impact (hereinafter referred to as a "side impact air bag apparatus"), and more particularly to a seat structure which has a side impact air bag apparatus at a side portion of a seat back frame.

2. Description of the Related Art

A seat structure having a side impact air bag apparatus has been conventionally known, and Japanese Patent Application Laid-Open (JP-A) No. 4-50052, U.S. Pat. No. 5,348, 342, U.S. Pat. No. 5,112,079, U.S. Pat. No. 5,222,761, U.S. Pat. No. 5,251,931, U.S. Pat. No. 5,498,030, etc., disclose such a seat structure. Among them, Japanese Patent Application Laid-Open (JP-A) No. 4-50052 discloses a seat structure in which a folded air bag is accommodated in a concave portion formed in a side portion of a seat base member. FIGS. 7 and 8 show an example of such a seat structure having a side impact air bag apparatus.

In the seat structure shown in FIG. 7, an air bag apparatus 74 is disposed within a side portion 72A of a seat back 72.

As shown in FIG. 8, the air bag apparatus 74 has a box-like shape whose longitudinal direction coincides with the vertical direction of the vehicle, and is attached to a side frame (i.e., reinforcing member) 80 of a seat back frame 78 using screws 83.

As shown in FIG. 7, a lid portion 82A is disposed opposite to the side frame 80 with respect to an air bag case 82. When the air bag 84 is expanded, the lid portion 82A opens outward in the widthwise direction of the seat (in the direction of arrow W in FIG. 7) around a hinge portion 82B formed at the rear end in the longitudinal direction of the vehicle. Moreover, upon opening of the lid portion 82A, a seat surface layer 86 is ruptured.

However, the above-described seat structure having a side impact air bag apparatus has the following problems.

(1) Since the air bag apparatus 74 is attached to the outer side surface 80A of the side frame 80 in the transverse direction of the vehicle, the overall width of the seat back 72 increases.

(2) Since the air bag apparatus 74 projects from the side frame 80 further toward the rear of the vehicle than the seat back, the thickness of the side portion 72A of the seat back 72 in the longitudinal direction of the vehicle also increases.

Accordingly, the effective room space of the vehicle decreases.

SUMMARY OF THE INVENTION

The present invention has been accomplished in view of the above-mentioned problems, and an object of the present invention is to provide a seat structure having a side impact air bag apparatus which can increase the room space of the vehicle.

A first aspect of the present invention is a seat structure having a side impact air bag apparatus. The seat structure includes a seat back frame which has side frames each provided at a corresponding widthwise direction side of a seat. An air bag accommodating concave portion is formed in one of the side frames which opposes a vehicle door such that the concave portion extends inward from an end portion of the seat back frame in the widthwise direction of the seat. The air bag accommodating concave portion accommodates an inflator and a folded air bag. A seat pad is provided for covering the seat back frame, and a seat surface layer is provided for covering the seat pad. The seat surface layer covers the air bag accommodating concave portion and the seat pad.

In the seat structure having a side impact air bag apparatus according to the first aspect of the present invention, the inflator and the folded air bag are accommodated in the air bag accommodating concave portion, which is formed by depressing the side frame toward the inside of the seat, and the inflator and the air bag are covered by the seat surface layer together with the seat pad. Accordingly, both the overall width of the seat back and the thickness of the side portion of the seat back in the longitudinal direction of the vehicle can be decreased, and therefore the interior room space of the vehicle can be increased. Moreover, since a bracket for attachment of the air bag apparatus and an air bag case can be omitted, the assembly can be performed with improved workability.

A second aspect of the present invention is a seat structure having a side impact air bag apparatus of the first aspect, wherein the seat pad has a substantially U-shaped slit formed in a side pad portion of the seat pad at a position opposing the air bag accommodating concave portion. The substantially U-shaped slit includes a base portion and two parallel leg portions forming a substantially U-shape, and the leg portions extends from the base portion toward the rear of the vehicle.

In the seat structure having a side impact air bag apparatus according to the second aspect of the present invention, an air bag cover is formed by the portion surrounded by the generally U-shaped slit formed in the side pad portion of the seat pad. Also, since the lid portion of the air bag can be omitted, the easiness of the assembly can be enhanced further.

A third aspect of the present invention is a seat structure having a side impact air bag apparatus. The seat structure includes a seat back frame which has side frames each provided at a corresponding widthwise direction side of a seat. An inflator mounting opening is formed in one of the side frames which opposes a vehicle door so as to allow an inflator and an inflator accommodating portion of the side impact air bag apparatus to pass therethrough. A seat pad is provided for covering the seat back frame, and a seat surface layer is provided for covering the seat pad. The seat surface layer covers the inflator mounting opening, the side impact air bag apparatus and the seat pad.

In the seat structure having a side impact air bag apparatus according to the third aspect of the present invention, the inflator and the inflator accommodating portion are fitted into the inflator mounting opening. Accordingly, the interior room space of the vehicle can be increased. Moreover, the inflator can be supported with increased rigidity.

DESCRIPTION OF THE PREFERRED EMBODIMENTS

A first embodiment of the present invention will be described with reference to FIGS. 1 and 4.

Figure 4:
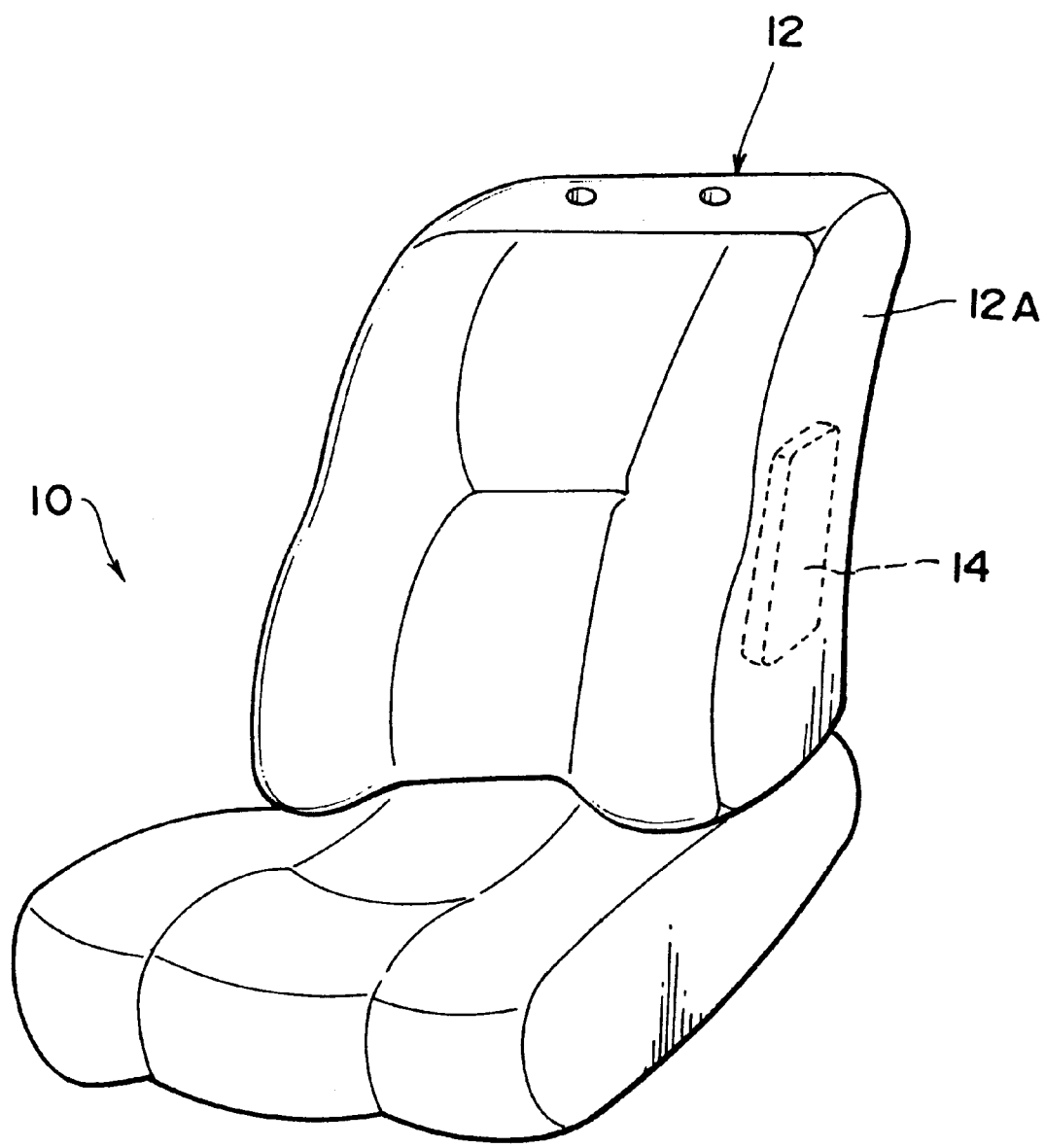
FIG. 4 is a perspective view of a seat to which the seat structure having a side impact air bag apparatus according to the first embodiment is applied, as viewed diagonally from the front of the seat.

As shown in FIG. 4, in a seat structure having a side impact air bag apparatus according to the first embodiment, a side impact air bag apparatus 14 having a box-like shape is disposed within a seat back 12 of a seat 10. More specifically, the air bag apparatus 14 is disposed within a side portion 12A formed at the outer side of the seat back 12 in the transverse direction of the vehicle such that the air bag apparatus 14 extends in the vertical direction.

Figure 2:
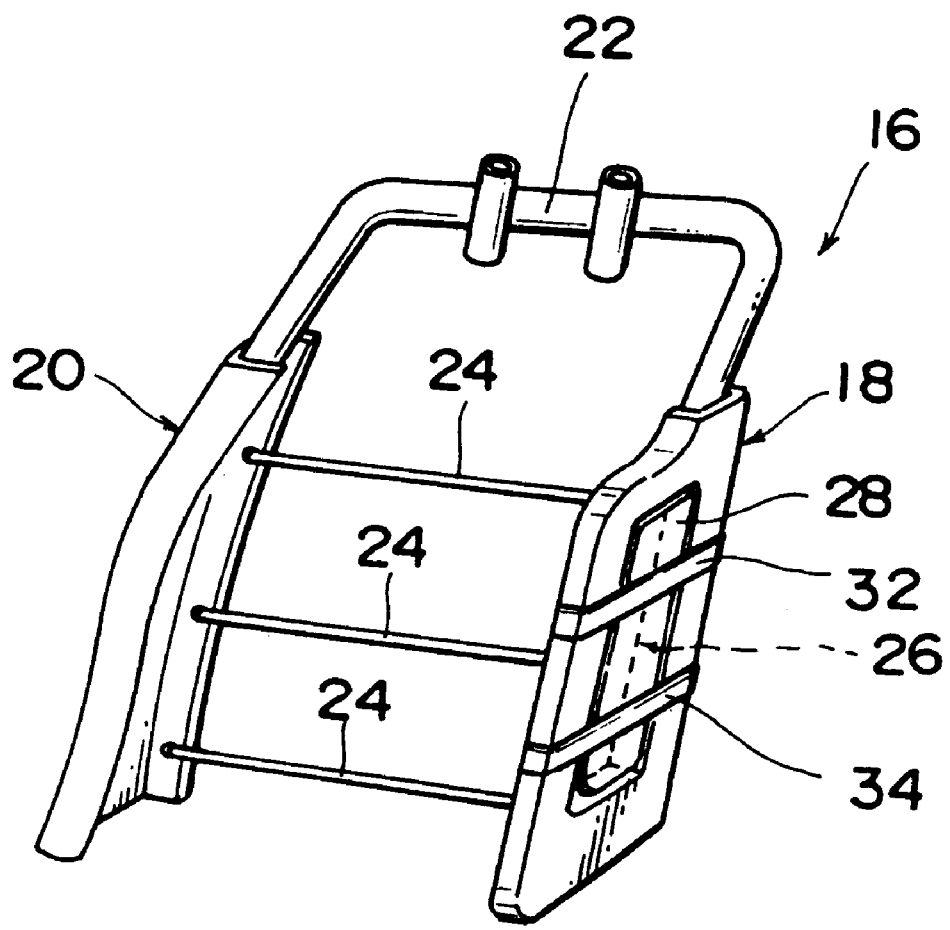
FIG. 2 is a perspective view of the seat back frame of the seat structure having a side impact air bag apparatus according to the first embodiment, as viewed diagonally from the front of the seat.

As shown in FIG. 2, a seat back frame 16 of the seat back 12 has a pair of side frame 18 and 20 each serving as a reinforcing member and disposed at a corresponding widthwise end of the seat back frame 16. The upper ends of the side frames 18 and 20 are connected to each other via an upper frame 22 which is formed of a tube material and is bent in a generally U-like shape. The edge portions of the side frame 18 and 22 located the rear side of the seat are connected to each other via a plurality of seat wires 24 arranged in the longitudinal direction of the side frames 18 and 20.

Figure 1:
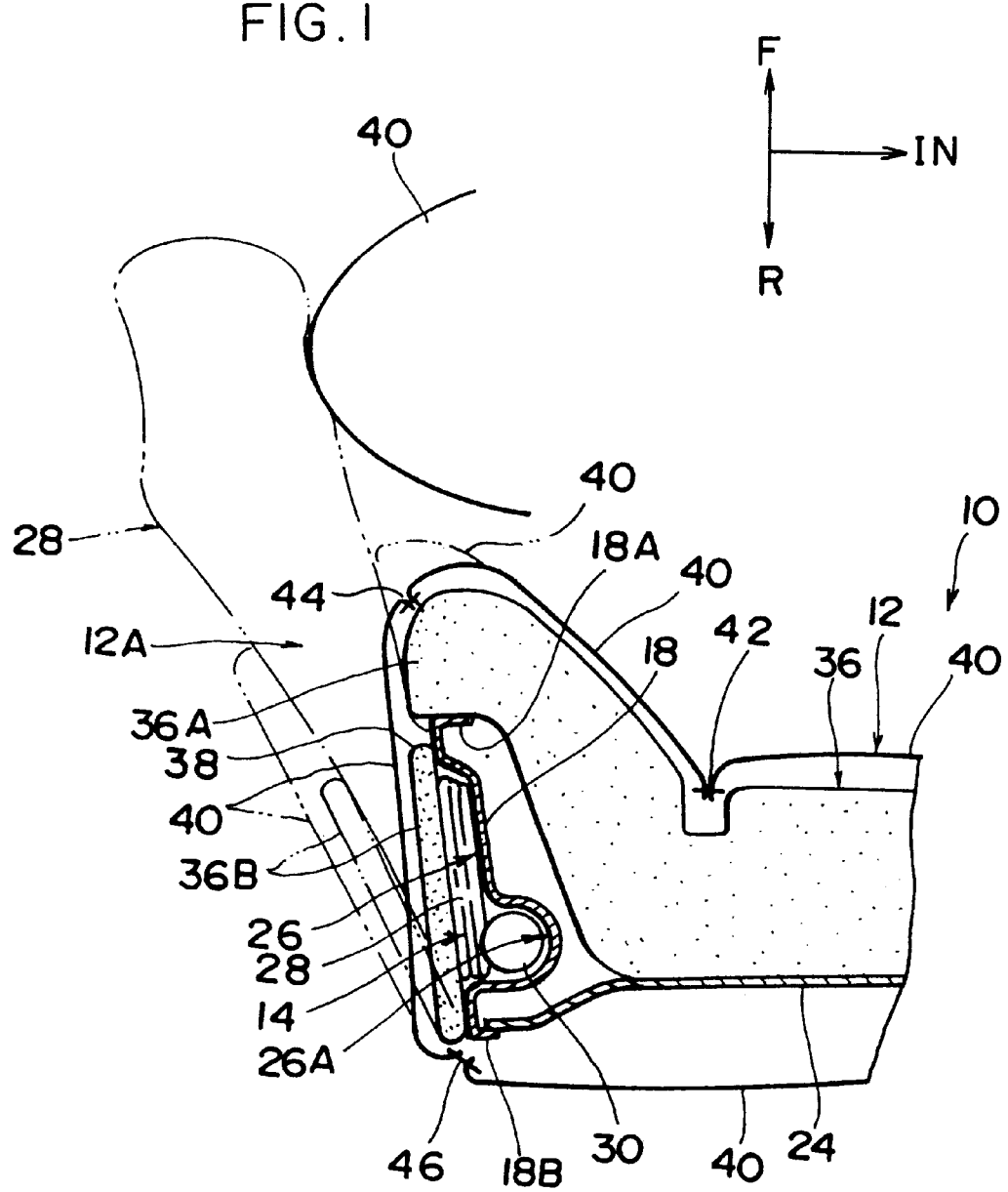
FIG. 1 is a horizontal cross-sectional view showing the side portion of a seat structure having a side impact air bag apparatus according to the a first embodiment of the present invention.

As shown in FIG. 1, at the forward end portion (i.e., the end portion in the direction F) of the side frame 18 located at the outer side in the transverse direction of the vehicle, there is formed a flange 18A which is bent inward in the widthwise direction of the seat (i.e., in the direction IN). Also, at the rear end portion (i.e., the end portion in the direction R) of the side frame 18, there is formed a flange 18B which is bent inward in the widthwise direction of the seat. At the central portion of the side frame 18 in the longitudinal direction of the vehicle is formed an air bag accommodating concave portion 26. This air bag accommodating concave portion 26 is formed by depressing the central portion of the side frame 18 toward the inside of the seat in a predetermined region extending in the longitudinal direction of the seat back. At the rear end of the air bag accommodating concave portion 26, the side frame 18 is further depressed toward the inside of the seat, thereby defining an inflator accommodating portion 26A.

A folded air bag 28 is accommodated in the air bag accommodating concave portion 26, and a cylindrical inflator 30 is accommodated in the inflator accommodating portion 26A. Accordingly, the portion of the side frame 18 which forms the concave portion 26 serves as a bottom portion of an air bag case, and the air bag 28 is deployed by gas jetted from the inflator 30.

As shown in FIG. 2, the air bag 28 is fixed to the side frame 18 by using fixing means such as, for example, two pieces of tape 32 and 34 provided at upper and lower portions of the side frame 18. These pieces of tape 32 and 34 are easily peeled off from the side frame 18 when the air bag 28 is deployed.

Figure 3:
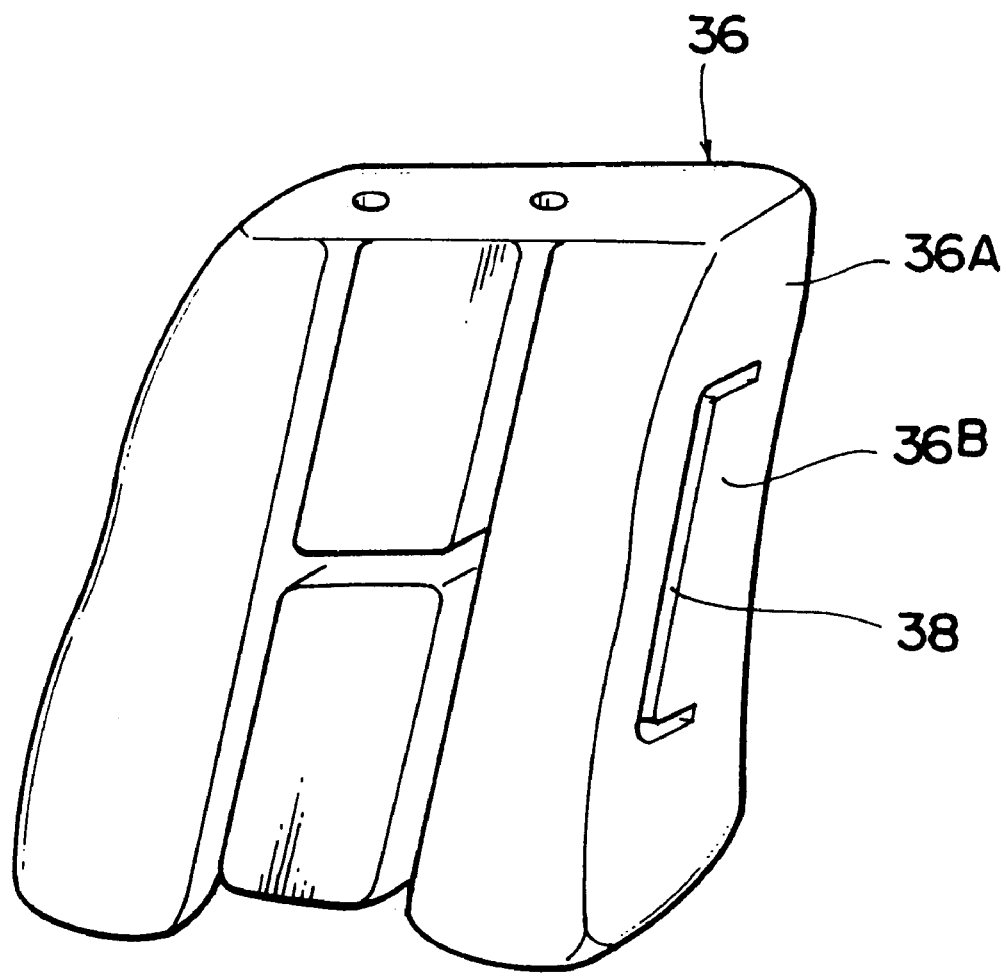
FIG. 3 is a perspective view of the seat pad of the seat structure having a side impact air bag apparatus according to the first embodiment, as viewed diagonally from the front of the seat.

A shown in FIG. 3, a U-shaped slit 38 is formed in the side pad portion 36A of the seat pad 36 which covers the seat back frame. The U-shaped slit 38 is formed such that the slit 38 faces the peripheral portion of the air bag accommodating concave portion 26 (see FIG. 1), and the rear side of the portion surrounded by the U-shaped slit 38 closer to the back of the seat is continuous with the side pad portion 36A. Accordingly, the portion surrounded by the slit 38, i.e., a lid portion 36B serves as a lid of an air bag case. When the air bag 28 is deployed, the lid portion 36B smoothly opens toward the outside of the seat.

As shown in FIG. 1, a seat surface layer 40 covers the outer face of the seat pad 36. This seat surface layer 40 is made by sewing several covering sheets at seams 42, 44, 46, etc., serving as sewn portions. Among these seams, the seam 44 faces the front edge portion of the side pad portion 36A of the seat pad 36. Therefore, when the air bag 28 is deployed, the seam 44 is broken so that the seat surface layer 40 can be easily ruptured there.

Next, the operation of the first embodiment will be described.

In the seat structure having a side impact air bag apparatus according to the first embodiment, when the gas inflator 30 of the air bag apparatus 14 is operated upon occurrence of a side crash, gas is jetted from the gas inflator 30. As a result, the air bag 28 is deployed from the side portion 12A of the seat back 12 toward the front side of the seat, as indicated by an imaginary line in FIG. 1, so that the air bag 28 abuts a side portion of an occupant 40 on the seat 10.

At this time, the lid portion 36B of the seat pad is pressed by the air bag 28 so that it smoothly opens outward, as illustrated by an imaginary line in FIG. 1, and the seam 44 of the seat cover 40 is easily broken. Accordingly, the air bag 28 can be deployed quickly.

In the seat structure having a side impact air bag apparatus according to the first embodiment, the inflator 39 and the folded air bag 28 are accommodated within the air bag accommodating concave portion 26, which is formed by depressing the side frame 18 inward in the widthwise direction of the seat, and the inflator 39 and the air bag 28 are covered together with the seat pad 36 by the seat surface layer 40. Accordingly, the overall width of the seat back 12 becomes smaller compared to the case where an air bag apparatus is attached to the outer side surface of the side frame. This increases the room space in the vehicle. The seat structure of the present embodiment does not deteriorate the appearance of the seat 10, and can be applied to seats of small vehicles.

Since the portion of the side frame 18 which forms the air bag accommodating concave portion 26 serves as the bottom portion of an air bag case and the lid portion 36B of the seat pad 36 serves as the lid portion of the air bag case, it is possible to eliminate a bracket for attaching the air bag apparatus to the side frame and an air bag case which have been used in conventional structures. Accordingly, the number of required parts can be decreased, and the assembly can be performed in a facilitated manner.

Next, a seat structure having a side impact air bag apparatus according to a second embodiment of the present invention will be described with reference to FIGS. 5 and 6.

The members identical to those of the first embodiment are denoted by the same reference numerals, and their descriptions will be omitted.

Figure 5:
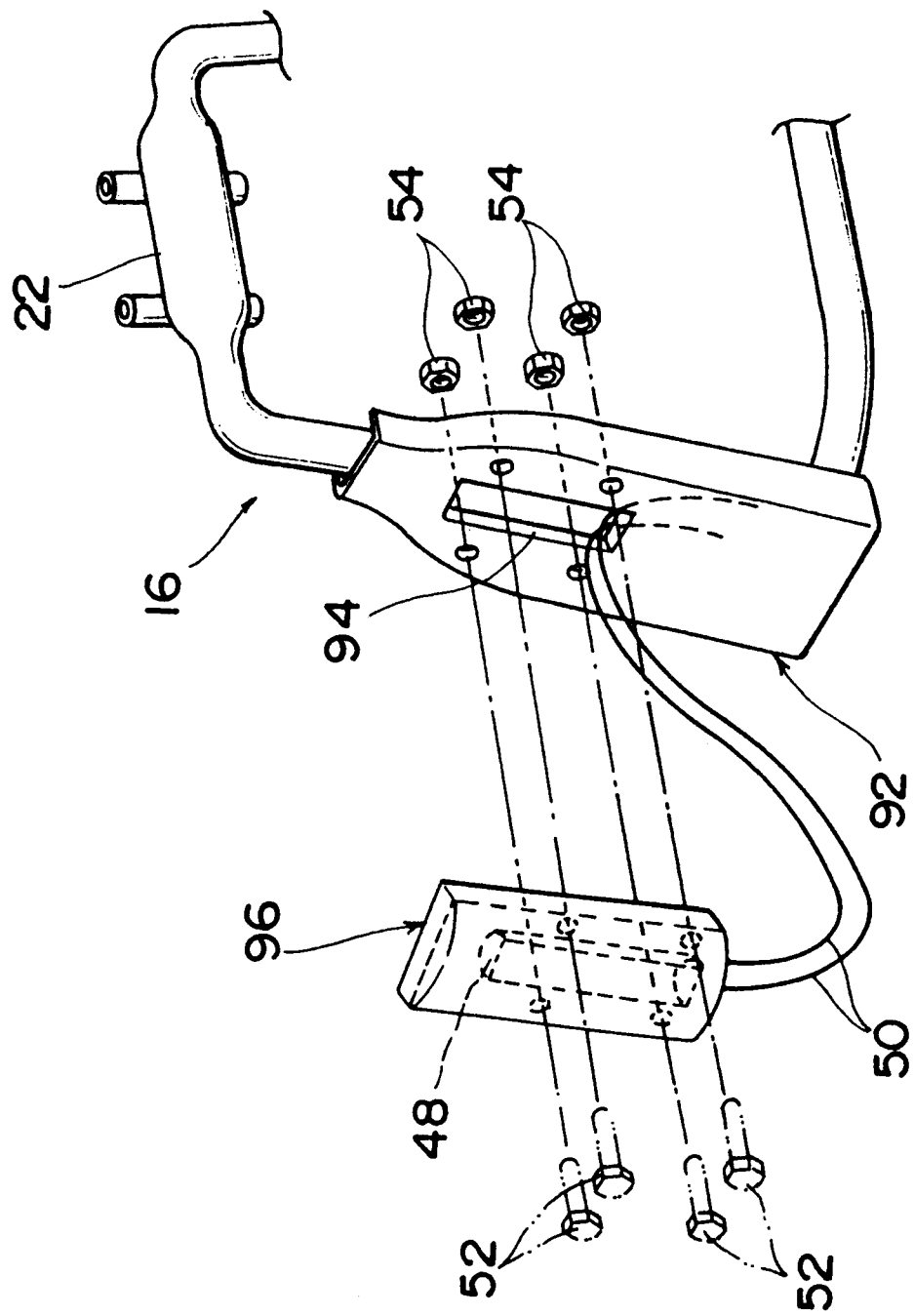
FIG. 5 is a perspective view of the seat back frame of the seat structure having a side impact air bag apparatus according to a second embodiment of the present invention, as viewed diagonally from the rear of the seat.

As shown in FIG. 5, in the seat structure having a side impact air bag apparatus according to the second embodiment, an inflator mounting opening 94 is formed in a side frame (reinforcing member) 92 of the seat back frame 16 such that the opening 94 runs in the longitudinal direction of the seat back. The electrical wire connected to an inflator 48 is led to the inside of the side frame 92 through the inflator mounting opening 94.

Figure 6:
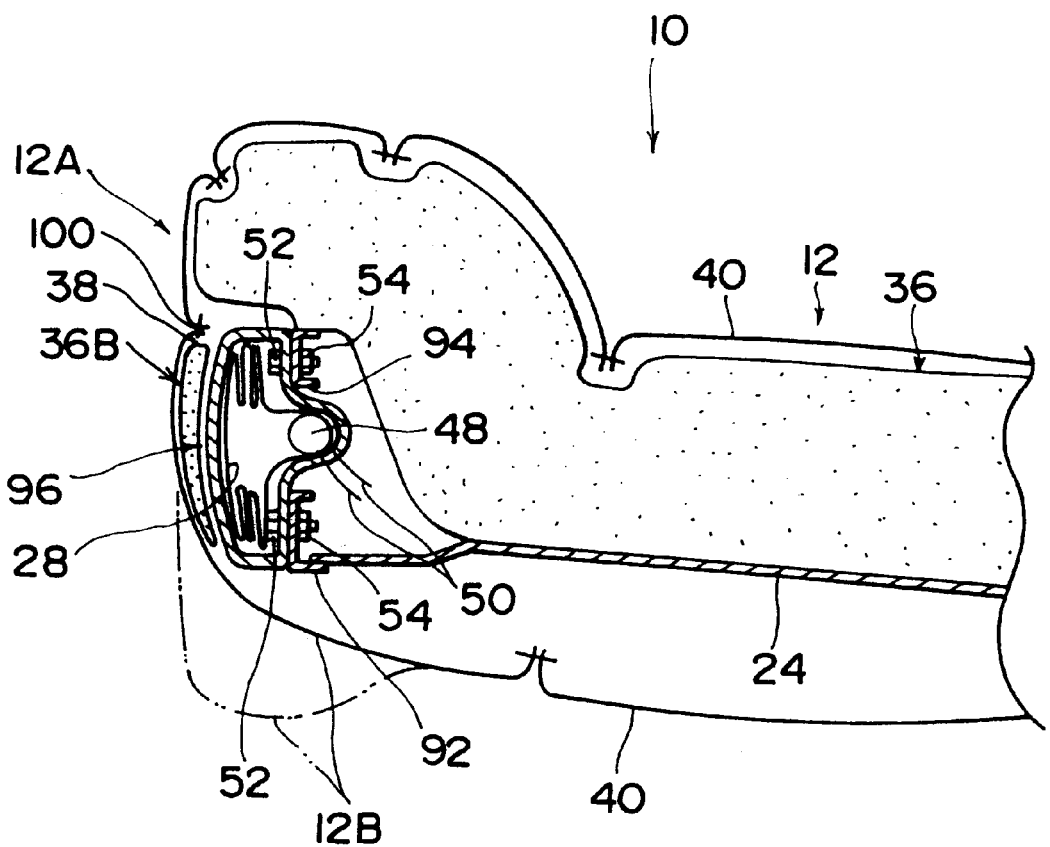
FIG. 6 is a horizontal cross-sectional view showing the side portion of the seat structure having a side impact air bag apparatus according to a second embodiment of the present invention.

As illustrating in FIG. 6, the inflator 48, together with the inflator accommodating portion 98 which projects toward the rear surface side of the air bag apparatus 96, is inserted in the inflator mounting opening 94 so as to be nipped and so as project further toward the vehicle transverse direction inner side than the side frame 92. The air bag apparatus 96 is directly fixed to the side frame 42 by the plurality of bolts 52, which serve as the fixing means, being inserted from the seat back frame 16 transverse direction outer side into through-holes provided in the air bag apparatus 96 and the side frame 92, and by the plurality of bolts 52 being screwed with nuts 54 which also serve as the fixing means. Further, the air bag apparatus 96 as well as the seat pad 36 are covered by the seat surface layer 40. When the air bag 28 is expanded, a seam 100, which is located in the vicinity of the lid portion 36B and serves as a sewn portion, is easily broken.

Figure 7:
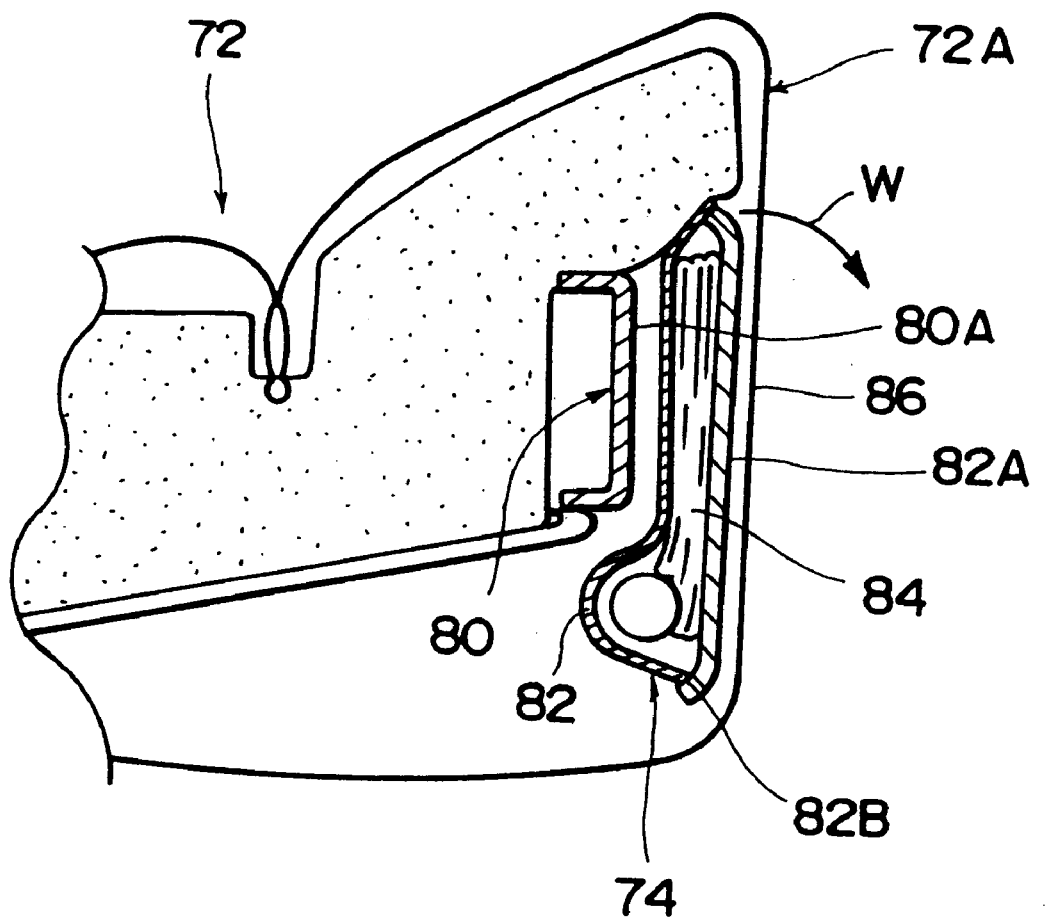
FIG. 7 is a horizontal cross-sectional view showing the side portion of a conventional seat structure having a side impact air bag apparatus.
Figure 8:
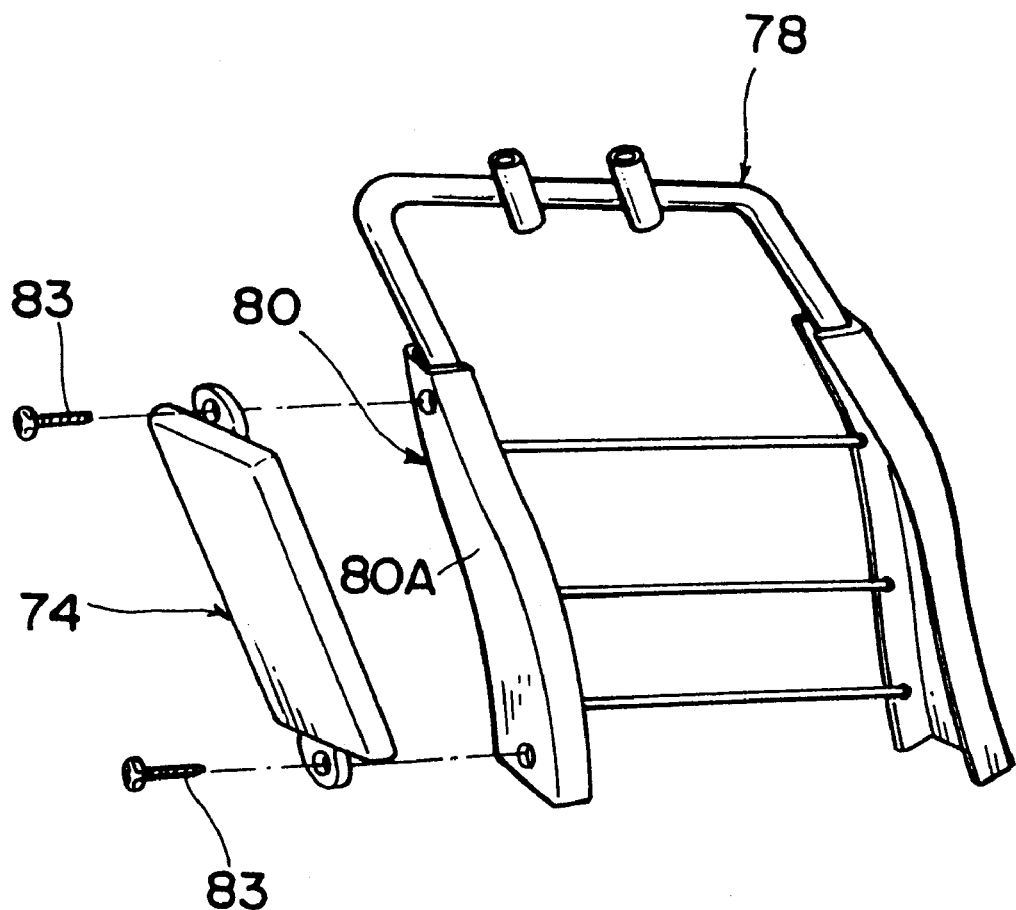
FIG. 8 is a perspective view of the seat back frame of the conventional seat structure having a side impact air bag apparatus, as viewed diagonally from the front of the seat.
Figure 9:
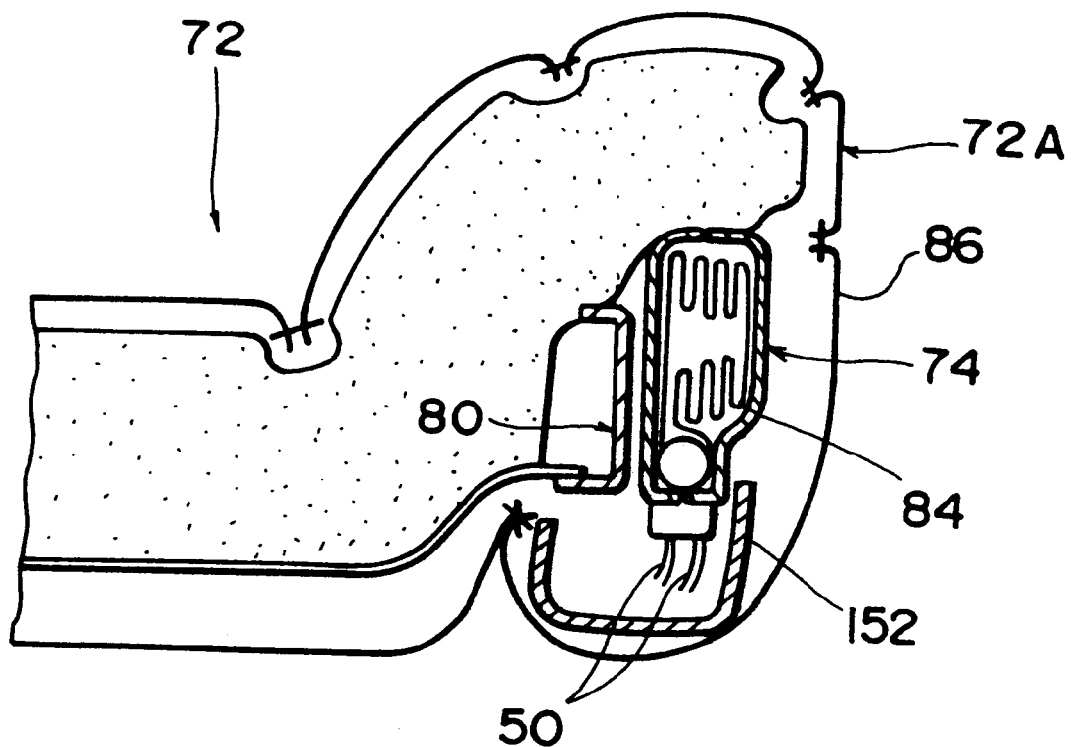
FIG. 9 is a horizontal cross-sectional view showing the side portion of another conventional seat structure having a side impact air bag apparatus.

As described above, in the seat structure having a side impact air bag apparatus according to the second embodiment of the present invention, the inflator 48 is fitted into the inflator mounting opening 94 such that the inflator 48 project inward from the side frame 92 in the transverse direction of the vehicle, and the electrical wire 50 of the inflator 48 is led to the inside of the side frame 92 through the inflator mounting opening 94. Accordingly, it is unnecessary to separately provide a cover for protecting the electrical wire 50, unlike the conventional structure shown in FIG. 9, in which a cover 152 is separately provided in the side portion 72A of the seat back 72 so as to protect the electrical wire 50. In FIG. 9, the members identical to those shown in FIG. 7 are denoted by the same reference numerals, and their descriptions will be omitted. Accordingly, a portion 12B rearwardly projecting from the side portion 12A of the seat back 12 as indicated by an imaginary line in FIG. 6 can be made smaller, so that the freedom in designing can be increased. In addition, since the number of required parts decreases, the assembly can be performed more efficiently.

Since the inflator 48 is mounted such that it is fitted into the inflator mounting opening 94 and projects inward from the side frame 92 in the transverse direction of the vehicle, the inflator 48 can be supported with increased rigidly.

The present invention has been described in detail with reference to the specific embodiments thereof, However, the present invention is not limited to those embodiment, and may be practiced in various manners without departing from the scope of the present invention.

What is claimed is:

1. A seat structure having a side impact air bag apparatus, comprising:
    a seat back frame having side frames each provided at a corresponding widthwise direction side of a seat;
    an inflator mounting opening which is formed in one of said side frames which opposes a vehicle door so as to allow an inflator of said side impact air bag apparatus and an inflator accommodating portion of said side impact air bag apparatus to pass through said inflator mounting opening;
    a seat pad for covering said seat back frame; and
    a seat surface layer for covering said seat pad,
    wherein said seat surface layer covers said inflator mounting opening, said side impact air bag apparatus and said seat pad.

2. A seat structure having a side impact air bag apparatus according to claim 1, wherein said seat surface layer has a sewn portion, and said sewn portion is broken upon expansion of said air bag.

3. A seat structure having a side impact air bag apparatus according to claim 1, further comprising:
    fixing means for fixing said air bag to said side frame.

4. A seat structure having a side impact air bag apparatus according to claim 3, wherein said fixing means is a screwing member.

5. A seat structure having a side impact air bag apparatus according to claim 4, wherein said screwing member is a bolt and a nut.

6. A seat structure having a side impact air bag apparatus according to claim 1, wherein said seat back frame has an upper frame for connecting said side frames each of which is provided at a corresponding widthwise direction side of the seat.

7. A seat structure having a side impact air bag apparatus according to claim 6, wherein said upper frame is a pipe-shaped member.

8. A seat structure having a side impact air bag apparatus according to claim 1, wherein said seat back frame has a connecting member for connecting the rear end portions of said side frames each of which provided at a corresponding widthwise direction side of the seat.

9. A seat structure having a side impact air bag apparatus according to claim 8, wherein said connecting member is a plurality of wires arranged in the longitudinal direction of said side frames.

10. A seat structure having a side impact air bag apparatus according to claim 1, wherein said inflator mounting opening is provided so as to allow an electrical wire connected to said inflator to be led toward the inside of said side frame in the widthwise direction of the seat.

11. A seat structure having a side impact air bag apparatus, comprising:
    a seat back frame having a plate-shaped side frame at a widthwise direction end portion of a seat, a through-hole being formed through the side frame; and
    an air bag apparatus fixed to the side frame from a vehicle outer side, the air bag apparatus including a folded air bag body and an inflator which inflates the air bag body, the air bag apparatus being fixed to the side frame in a state in which at least a portion of the inflator is inserted in the through-hole.

12. A seat structure according to claim 11, wherein a wire for activating the inflator passes through the through-hole to an inner side of the side frame.

13. A seat structure according to claim 11, wherein the air bag apparatus is formed in the shape of a box in which the folded air bag body is accommodated.

14. A seat structure according to claim 11, wherein the through-hole is rectangular.

15. A seat structure according to claim 11, wherein a mounting bolt projects from the air bag apparatus, passes through the side frame, and screws together with a nut from the opposite side of the side frame such that the air bag apparatus is fixed to the side frame.

16. A seat structure according to claim 11, wherein a plurality of bolts for mounting the air bag apparatus to the side frame pass through the side frame at least at two sides of the through-hole.

17. A seat structure having a side impact air bag apparatus, comprising:
   seat pads for supporting a central portion of a back and side portions of a back of a seated vehicle occupant;
   a side frame disposed at a vehicle longitudinal direction rear side of the seat pad supporting a side portion of the back of the seated vehicle occupant, a through-hole being formed through the side frame; and
   an air bag apparatus fixed to the side frame from a vehicle outer side, the air bag apparatus including a folded air bag body and an inflator which inflates the air bag body, the air bag apparatus being fixed to the side frame in a state in which at least a portion of the inflator is inserted in the through-hole.

18. A seat structure according to claim 17, wherein a wire for activating the inflator passes through the through-hole to an inner side of the side frame.

19. A seat structure according to claim 17, wherein the air bag apparatus is formed in the shape of a box in which the folded air bag body is accommodated.

20. A seat structure according to claim 17, wherein the through-hole is rectangular.

21. A seat structure according to claim 17, wherein a mounting bolt projects from the air bag apparatus, passes through the side frame, and screws together with a nut from the opposite side of the side frame such that the air bag apparatus is fixed to the side frame.

22. A seat structure according to claim 17, wherein a plurality of bolts for mounting the air bag apparatus to the side frame pass through the side frame at least at two sides of the through-hole.

\* \* \* \* \*

UNITED STATES PATENT AND TRADEMARK OFFICE
CERTIFICATE OF CORRECTION

PATENT NO.    : 6,089,594
DATED         : July 18, 2000
INVENTOR(S)   : Hasegawa et al.

It is certified that error appears in the above-identified patent and that said Letters Patent is hereby corrected as shown below:

Please change "[56] References cited 5,238,342 8/1993 Haland et al."

TO

-- [56] References cited 5,348,342 8/1993 Haland et al. --

Signed and Sealed this

Eighteenth Day of September, 2001

*Attest:*

NICHOLAS P. GODICI
*Attesting Officer*   *Acting Director of the United States Patent and Trademark Office*